(12) United States Patent
Rohs et al.

(10) Patent No.: US 8,708,864 B2
(45) Date of Patent: Apr. 29, 2014

(54) BEVEL FRICTION RING GEARING AND METHOD FOR MOUNTING OR PRODUCING A BEVEL FRICTION RING GEARING

(75) Inventors: Ulrich Rohs, Dueren (DE); Christoph Draeger, Langerwehe (DE); Werner Brandwitte, Langerwehe (DE)

(73) Assignee: Ulrich ROHS, Dueren (DE)

( * ) Notice: Subject to any disclaimer, the term of this patent is extended or adjusted under 35 U.S.C. 154(b) by 475 days.

(21) Appl. No.: 12/734,572

(22) PCT Filed: Nov. 27, 2008

(86) PCT No.: PCT/DE2008/001966
§ 371 (c)(1),
(2), (4) Date: May 10, 2010

(87) PCT Pub. No.: WO2009/068012
PCT Pub. Date: Jun. 4, 2009

(65) Prior Publication Data
US 2010/0261573 A1 Oct. 14, 2010

(30) Foreign Application Priority Data
Nov. 27, 2007 (DE) .................... 10 2007 057 354

(51) Int. Cl.
*F16H 15/42* (2006.01)
(52) U.S. Cl.
USPC ............................................. 476/53; 476/51

(58) Field of Classification Search
USPC .................................................. 476/51, 52, 53
See application file for complete search history.

(56) References Cited

U.S. PATENT DOCUMENTS

| | | | | |
|---|---|---|---|---|
| 2,038,731 A | * | 4/1936 | Gunderson | 74/425 |
| 2,807,171 A | | 9/1957 | Wyckoff | |
| 2,898,775 A | * | 8/1959 | Reid | 74/435 |
| 7,553,254 B2 | | 6/2009 | Rohs et al. | |
| 7,559,868 B2 | * | 7/2009 | Rohs et al. | 475/211 |
| 2009/0118073 A1 | | 5/2009 | Rohs et al. | |

FOREIGN PATENT DOCUMENTS

| | | |
|---|---|---|
| EA | 007706 | 12/2006 |
| JP | 2009126289 | 6/2009 |
| WO | WO 2004/061336 | 7/2004 |
| WO | WO 2006/012892 | 2/2006 |

OTHER PUBLICATIONS

English Translation of Russian Office Action for Russian Application Serial No. 2010118490/11(026243) dated Mar. 4, 2013, 4 pages.

* cited by examiner

*Primary Examiner* — William C Joyce
(74) *Attorney, Agent, or Firm* — Collard & Roe, P.C.

(57) ABSTRACT

The aim of the invention is to further develop a bevel friction ring gearing. The invention thus relates to a bevel friction ring gearing in which the friction ring can be displaced by means of an adjusting device that comprises a guide on which an adjusting bridge for the friction ring is arranged in a free axially displaceable manner. The adjusting device comprises a worm-gear drive that engages with the guide.

30 Claims, 4 Drawing Sheets

BEVEL FRICTION RING GEARING AND METHOD FOR MOUNTING OR PRODUCING A BEVEL FRICTION RING GEARING

CROSS REFERENCE TO RELATED APPLICATIONS

This application is the National Stage of PCT/DE2008/001966 filed on Nov. 27, 2008, which claims priority under 35 U.S.C. §119 of German Application No. 10 2007 057 354.7 filed on Nov. 27, 2007. The international application under PCT article 21(2) was not published in English.

BACKGROUND OF THE INVENTION

1. Field of the Invention

The invention on the one hand relates to a bevel friction ring gearing wherein the friction ring can be displaced by means of an adjusting device having a guide on which an adjuster, such as for example an adjusting bridge, is arranged in a free axially displaceable manner. On the other hand the invention relates to a bevel friction ring gearing with a drive cone which is operationally connected with a drive via a positive connection. In addition to this the invention relates to a bevel friction ring gearing comprising separate fluid spaces for a traction fluid and for a lubricant fluid as well as two gearing sides of which the one is arranged on the side of the cone tip of the drive cone and the other on the side of the cone foot of the drive cone, wherein the fluid space for the lubricant fluid comprises at least two part-spaces and a first part-space is arranged on the one gearing side and a second part space on the other gearing side. The invention also relates to a bevel friction ring gearing with at least two cones which alternatively interact with each other via a friction ring and are clamped together via a pressure device for generating a pressing-on force dependent on the rotational moment, wherein the pressure device comprises rolling bodies which are arranged in corresponding rolling body races of two bodies displaceable relative to each other. In addition, the invention relates to a bevel friction ring gearing with at least two cones which interact with each other via a friction ring, wherein at least one of the cones has a separate bearing pin. In addition the invention relates to a bevel friction ring gearing with at least two cones which interact with each other via a friction ring and are clamped together via a pressure device for generating a pressing-on force dependent on the rotational moment, wherein the pressing-on device comprises two bodies displaceable relative to each other. Furthermore, the invention relates to a bevel friction ring gearing with a clutch arranged on the input side and/or a clutch on the output side. In addition, the invention relates to a bevel friction ring gearing with at least two cones which interact with each other via a friction ring and are clamped together via a pressing-on device for generating a pressing-on force depending on the rotational moment, wherein the pressing-on device comprises two bodies displaceable relative to each other as well as a spring element. In addition, the invention relates to a bevel friction ring gearing with two cones, which interact with each other via a friction ring, and which are clamped together via a pressing-on device for generating a pressing-on force dependent on the rotational moment and is mounted on both sides in bearings which are held in bearing carriers. In addition, the invention relates to a method for producing a bevel friction ring gearing as well as a method for assembling a bevel friction ring gearing.

2. The Prior Art

Generic bevel friction ring gearings are well known from the prior art, wherein the bevel friction ring gearings forming the basis of the invention are particularly disclosed both in the international patent application WO 2006/012892 A2, particularly in its FIGS. 39 and 49, as well as in the international patent application WO 2004/061336 A1, particularly in its FIG. 12.

SUMMARY OF THE INVENTION

It is the object of the present invention to further develop generic bevel friction ring gearings so that they can be constructed in a more compact form yet can be operated in an operationally safe manner, are easier to assemble and disassemble and to maintain.

The object of the invention is solved by a bevel friction ring gearing, wherein the friction ring is displaceable via an adjusting device having a guide, on which an adjuster, such as more preferably an adjusting bridge for example for the friction ring, is arranged in a free axially displaceable manner, wherein the bevel friction ring gearing is characterized in that the adjusting device comprises a worm-gear drive. Such an adjusting device equipped with a worm-gear drive advantageously makes possible a large transmission ratio with relatively small installation space. It also succeeds in rendering the control of the friction ring by means of the worm-gear drive substantially more precise.

Here, the term "adjusting device" substantially describes any device by means of which the friction ring can be axially adjusted relative to friction cones of the bevel friction ring gearing. Here, it is not stringently required that the adjusting device should comprise an adjusting bridge, which has to be stringently designed bridge-like, an adjuster constructed differently can also be employed. In particular, the term "adjuster" describes any assembly that guides the friction ring and migrates with said friction ring axially relative to the friction cones depending on the transmission ratio.

The invention is substantially advantageous for all types of bevel friction ring gearings, wherein it is particularly immaterial if a cone surface of the friction cones, also called cones in brief, has a straight-line or an arched generatrix.

Here, the term "friction ring" describes any device that connects two friction cones of the friction ring gearing more preferably in a frictional manner, wherein the friction ring can axially move forward and backward by means of the adjusting device in a gap of two opposing friction cones and axially to these friction cones. Ideally, the friction ring engages about one of the two friction cones so that at least a part of one of the two friction cones is arranged within the friction ring.

A preferred embodiment version provides that the worm-gear drive acts on an eccentric on which a coupling rod is arranged. Advantageously a space-saving yet operationally safe double reduction can be realised in a constructionally simple manner by means of the worm-gear drive on the one hand and by means of the eccentric in conjunction with the coupling rod on the other hand.

Here it is advantageous if the coupling rod acts on an adjusting bridge guide. For example, an end of the coupling rod facing away from the eccentric is fastened to the guide of the adjuster in an articulated or rotationally moveable manner. If the coupling rod is additionally spring-loaded, a first overload safety of the bevel friction ring gearing can be accomplished on the adjusting device in a constructionally simple manner.

In addition it is advantageous if the worm-gear drive is of a design retained by friction. Especially when the friction ring of the bevel friction ring gearing is not to be adjusted, the bevel friction ring gearing can be operated in a particularly energy-saving manner since because of the retention by friction of the worm-gear drive the risk of unintentional adjustment of the friction ring can be prevented.

The object of the invention is also solved by a bevel friction ring gearing with a drive cone that is operationally connected with a drive via a positive connection, wherein the operational connection comprises a positive connection that is secured via a central screw.

An arrangement of this type substantially has two advantages. On the one hand the positive connection, which is secured via a central screw, produces particularly favourable force distribution so that drive forces can be introduced particularly homogenously into the drive cone of the bevel friction ring gearing by a drive. On the other hand, particularly because of the central screw which secures the positive connection between the drive cone and the drive, particularly simple assembly of the drive cone on the drive is achieved.

On the other hand, the object of the invention is also solved by a bevel friction ring gearing with a drive cone that is operationally connected with a drive via a positive connection, wherein the operational connection comprises a positive connection that is secured via a tensile screw.

By means of a tensile screw more preferably a particularly simple tolerance offset especially in the region of the positive connection is achieved with respect to the drive cone and the drive. Even by this alone can the lifespan of the bevel friction ring gearing be substantially increased, more so since a tensile screw can ensure almost optimal and operationally safe assembly with respect to the drive cone and the drive. In particular, possible tolerances during the assembly but also over the lifespan of the bevel friction ring gearing can be offset in an operationally safe and constructionally simple manner.

If the tensile screw has a clamping length which is greater than the screw diameter, even longer distances between a support region of the screw head of the tensile screw and a threaded bore into which the tensile screw is screwed can be bridged by means of the tensile screw. The stretching properties of the tensile screw are then also applied in a particularly favourable manner.

If the tensile screw has a clamping length which is substantially greater than the screw diameter the tensile screw can be advantageously passed through a body of a friction cone, more preferably for example through the body of the drive cone, and screwed into a suitable tensile screw thread on the sides of the drive. Because of this, the assembly of the drive cone to the drive can be hugely simplified in addition and a long screw length be provided for the tensile screw.

Depending on how the friction cone, more preferably the drive cone, of the bevel friction ring gearing is dimensioned or configured it can already be sufficient in an advantageous manner if the tensile screw has a clamping length which is at least twice that of the screw diameter of the tensile screw.

In order to further increase the operational safety of the bevel friction ring gearing it is advantageous if the tensile screw has a tensile length which is greater than the setting length of the bevel friction ring gearing, in particular its bearing race. By means of such a tensile length it can be almost always ensured that the drive cone and the drive are connected to each other with a predetermined clamping force, even if other components of the bevel friction ring gearing will still set relative to each other during the course of the operation. By means of this, the operational safety of the bevel friction ring gearing can be substantially improved further.

The object of the invention is also solved by a bevel friction ring gearing which comprises separate fluid spaces for a traction fluid and for a lubricant fluid as well as two gearing sides, of which the one is arranged on the side of the cone tip of the drive cone and the other on the side of the cone foot of the drive cone, wherein the fluid space for the lubricant fluid comprises at least two part spaces and a first part space is arranged on the one gearing side and a second part space on the other gearing side and wherein the bevel friction ring gearing is characterized by a lubricant channel which connects the two part spaces and penetrates one of the cones. Because of this, a separate line for lubricant can be advantageously omitted in this manner, which further simplifies the construction of the bevel friction ring gearing.

It is particularly advantageous in this context if the lubricant channel comprises two cone inlet openings to a rotating channel region with diameters that deviate from each other. Advantageously, through the different diameters and due to gravitational force a pumping effect can be achieved as a result of which components of an external lubricant pump can be omitted. Because of this, the construction of the bevel friction ring gearing can be advantageously reduced. On the other hand, it can increase the operational safety of the bevel friction ring gearing since additional components of an external lubricant pump can be omitted.

It is additionally advantageous if a wall of the lubricant channel in the interior of the cone is radially further removed from the cone axis than the wall on the cone inlet opening. Because of this, cleaning of the lubricant due to gravitation can take place since dirt particles of the lubricant can settle within the cone region.

If the lubricant channel expands within the cone, dirt particles can be trapped in a particularly favourable manner.

A particularly preferred embodiment version in this context also provides that the lubricant channel penetrates a screw. If such a lubricant channel is provided within a screw the screw becomes more thin-walled and can thus be advantageously employed also as tensile screw. Specifically, the screw comprising the lubricant channel can be employed as tensile screw for establishing an operational connection of a positive connection between the drive cone and the drive.

The object of the invention is also solved by a further bevel friction ring gearing with at least two cones which interact with each other via a friction ring and which are clamped together via a pressing-on device for generating a pressing-on force dependent on the rotational moment, wherein the pressing-on device comprises rolling bodies which are arranged in corresponding rolling body races of two bodies displaceable relative to each other, and wherein one of the rolling body races is formed in one of the cones.

If one of the rolling body races is directly formed in one of the cones of a bevel friction ring gearing the pressing-on device can more preferably be provided with extraordinarily small tolerances and thus hugely free of play. Assembly is also simplified accordingly.

A further solution of the object of the invention proposes a bevel friction ring gearing with at least two cones which interact with each other via a friction ring, wherein at least one of the cones has a separate bearing pin, wherein the separate bearing pin is connected with the cone via a seat divided in two.

By means of the separate bearing pin a more simple and operationally safe assembly can be guaranteed. Especially through the seat divided in two of the separate bearing pin can the risk of canting of the separate bearing pin with the corresponding cone be minimised. However, even a single bearing seat can guarantee adequate bearing on a cone if the bearing seat is made adequately wide.

Advantageously an extraordinarily even forced distribution on the seat divided in two can be achieved between the separate bearing pin and the cone if both part seats have a rotation-symmetrical seat surface. Because of this, the separate bearing pin and the cone corresponding therewith can be produced without problems and matched to each other.

In order to be able to sustainably guarantee favourable lever conditions and because of this very high stability with respect to the separate bearing pin and the corresponding cone it is advantageous if both part seats are arranged at a different axial height of the corresponding cone.

Advantageously a first part seat is arranged axially outside with respect to the cone and designed radially larger than the second part seat arranged axially further inside, as a result of which the construction of this arrangement can be simplified yet again. Because of this, the corresponding cone can be advantageously produced with a lesser material quantity, for example by means of a forging process.

At this point, reference is made to a further solution of the object, namely to a bevel friction ring gearing which is characterized by at least one forged cone. Such a forged cone can be provided particularly light in weight, with high quality and corresponding longevity and accordingly is advantageous even independent of the remaining features of the present invention.

In this context the object of the invention is also solved by a method for producing a bevel friction ring gearing wherein at least one of the cones comprises at least one forged assembly.

It must be particularly emphasised in this connection that the assembly of the cone that provides the cone surface is advantageously forged. More preferably a forged cone surface can excel through particularly high strength characteristics and thus improve the lifespan and the operational safety of the present bevel friction ring gearing yet again.

A special embodiment version in this context provides that all cones comprise forged assemblies as a result of which the operational safety of the bevel friction ring gearing as a whole can be further increased.

With a view to a separate bearing pin a further advantageous embodiment version provides that the cone and the separate bearing pin are connected with each other via a press fit. Because of this, a simple, quick and operationally safe connection can more preferably be executed between the separate bearing pin and the corresponding cone.

Accordingly, the object of the invention is also solved by a method for the assembly of a bevel friction ring gearing, wherein a separate bearing pin and a cone are pressed together.

If a separate bearing pin and a cone are thus pressed together, a particularly simple, quick and operationally safe connection with respect to a bevel friction ring gearing can be achieved between the separate bearing pin and the cone.

It is to be understood that in addition to the type of connection with respect to the press fit cumulatively or alternatively additional connection types can also be selected. Insofar a further embodiment version provides that the cone and the separate bearing pin are welded together. Accordingly, an, alternative method version provides that the separate bearing pin and a cone are welded together following the pressing together.

Because of this, a particularly sound seal can additionally be achieved at the interface of separate bearing pin/cone, which is more preferably advantageous if the cone is partially or entirely filled with lubricant.

A further solution of the present object provides a bevel friction ring gearing with at least two cones which interact with each other via a friction ring and are clamped together via a pressing-on device for generating a pressing-on force dependent on the rotational moment, wherein the pressing-on device comprises two bodies that can be displaced relative to each other, wherein at least one of the displaceable bodies is mounted on one of the cones by way of a needle bearing.

More preferably mounting the displaceable body on one of the cones by means of a needle bearing can guarantee an extraordinarily good safeguard against tilting moments so that the bevel friction ring gearing can boast particularly high operational safety and a long lifespan.

Yet further improved safeguarding against undesirable tilting can be achieved if the needle bearing is designed split, so that at least two needle bearing races with respect to a cone axis of rotation are arranged axially next to each other.

In addition, the object of the invention is solved by a bevel friction ring gearing with a clutch arranged on an input side and/or a clutch arranged on an output side, wherein the clutch is hydraulically activated. A hydraulically activated clutch more preferably has the advantage that assemblies for the hydraulic activation can be placed in a space-saving manner in a clear space between the cone axes of rotation and the installation space for the adjusting device, for example the worm-gear drive. Through this alone conventional bevel friction ring gearings can be constructed substantially more compact with respect to their size.

Another solution of the object proposes a bevel friction ring gearing with at least two cones which interact via a friction ring and which are clamped together via a pressing-on device for generating a pressing-on force dependent on the rotational moment, wherein the pressing-on device comprises two bodies that are displaceable relative to each other and a spring element, and wherein the bevel friction ring gearing is characterized in that the spring element can be removed without removing the displaceable bodies.

Advantageously, outstanding assembly free of play can be made possible because of this, since the corresponding assembly can be carried out without critical pre-stress or entirely without pre-stress.

In this context the object of the invention is also solved by a method of a bevel friction ring gearing, wherein all cones are mounted on both sides in their bearing carriers and their respective spring element is mounted thereafter. Advantageously the cones are easier to adjust because of this, since at least up to this assembly stage assembly can be performed without pre-stress.

Furthermore, the object of the invention is also solved by a bevel friction ring gearing with at least two cones which interact with each other via a friction ring, which cones are clamped together via a pressing-on device for generating a pressing-on force dependent on the rotational moment and which on both sides are mounted in bearings which are held in bearing carriers, wherein both bearing carriers are designed in one piece.

Advantageously a design of the bearing carriers so selected produces fewer tolerance problems, as a result of which more preferably the manufacture and the assembly of the bevel friction ring gearing can be simplified. In addition, the operational safety and the lifespan of such a bevel friction ring gearing also benefit from fewer tolerance problems.

Accordingly, a method for the assembly of a bevel friction ring gearing is proposed as a further solution of the object, wherein the bodies of a pressing-on device displaceable relative to each other are assembled initially and their spring elements thereafter.

Since the displaceable bodies can be ideally adjusted without any critical pre-stress, assembly of a bevel friction ring gearing is substantially facilitated.

Additional advantages, objectives and characteristics of the present invention are described by means of the following explanation of the enclosed drawing in which a first exemplary embodiment of a bevel friction ring gearing is exemplarily shown more preferably with respect to an adjusting device with a worm-gear drive.

DETAILED DESCRIPTION OF THE PREFERRED EMBODIMENTS

Figure 1:
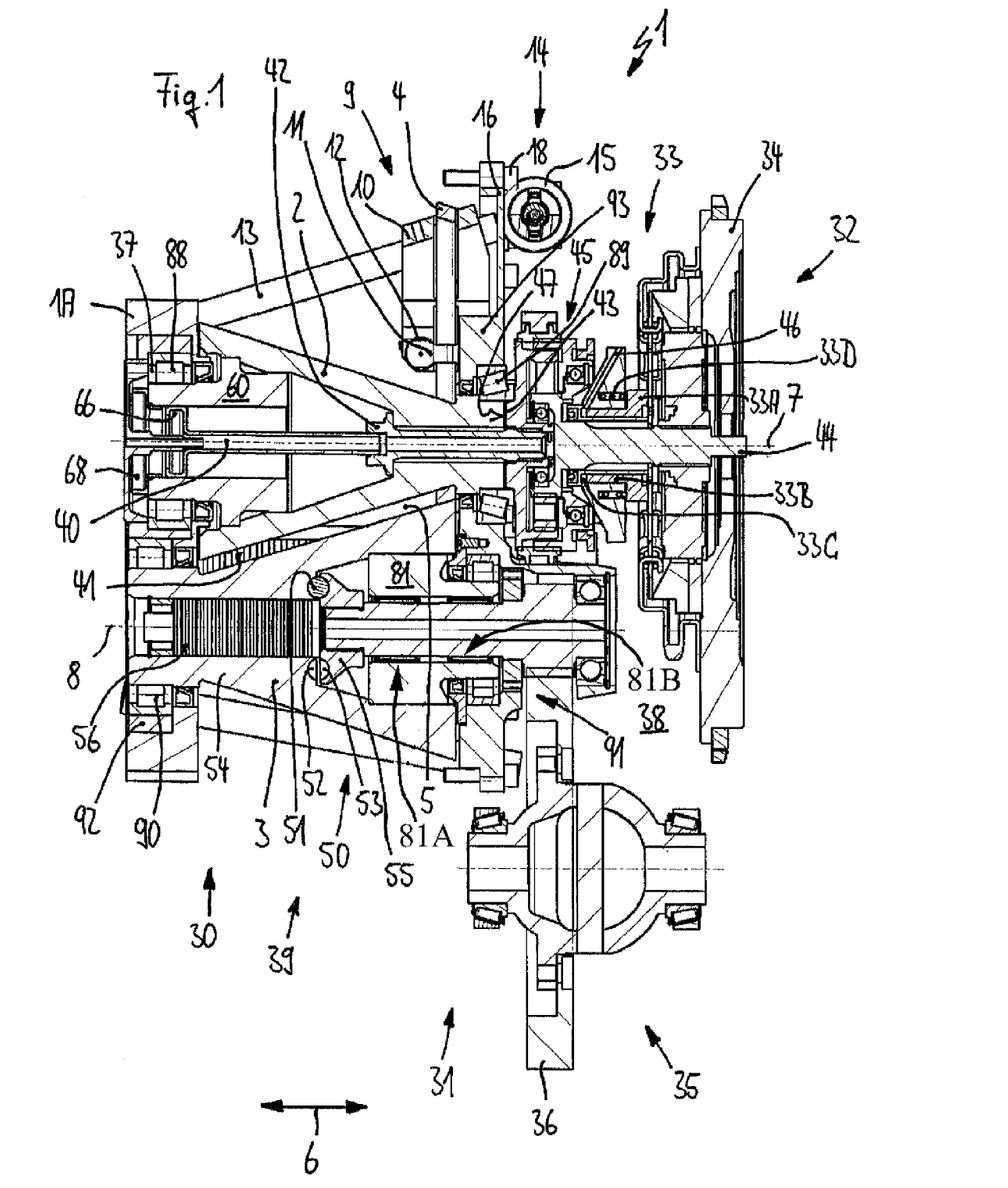
FIG. 1 schematically a longitudinal sectional view of a bevel friction ring gearing.

The bevel friction ring gearing 1 shown in FIG. 1 comprises as first substantial components a drive cone 2, an output cone 3 and a friction ring 4, wherein the friction ring 4, engaging about the drive cone 2, can be moved forward and backward in a gap 5 between the drive cone 2 and the output cone 3 according to the double arrow 6. Here, the drive cone 2 can rotate about a first axis of rotation 7, while the output cone 3 can rotate about a further axis of rotation 8.

In order to make possible that the friction ring 4 can be adjusted specifically according to the double arrow 6 the friction ring 4 is displaceably fastened or held within the cone friction ring gearing 1 by means of an adjusting device 9.

The adjusting device 9 substantially comprises an adjusting bridge 10 which is effective as adjuster and comprises a guide arm 11 with a plurality of guide wheels 12 (merely one is exemplarily shown), by means of which the friction ring 4 can be held and guided within the bevel friction ring gearing 1.

Here, the adjusting bridge 10 can be moved along an adjusting bridge guide 13, so that the friction ring 4 can be moved forward and backward in the gap 5 according to the double arrow 6. The adjusting bridge guide 13 with this exemplary embodiment runs in alignment with the gap 5, as a result of which the friction ring 4 can be precisely moved along and within the gap 5.

In order to initiate migration of the friction ring 4 within the gap 5 it is already sufficient if the adjusting bridge guide 13 is merely displaced by a small amount in terms of its position in a manner known per se. To this end, the adjusting device 9 comprises a drive 14 which is designed as worm-gear drive 15. The construction of the drive 14 of the present bevel friction ring gearing 1 can be very clearly retraced by means of the representation according to FIG. 6.

Figure 6:
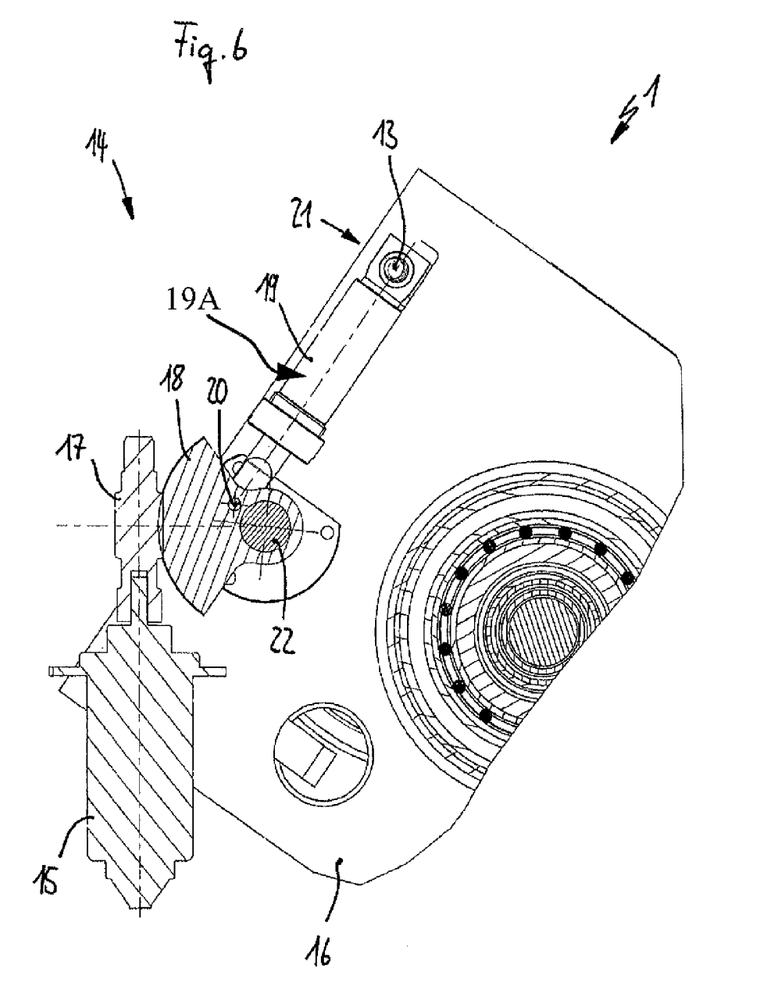
FIG. 6 schematically a view of a worm-gear drive of the adjusting device of the bevel friction ring gearing according to FIG. 1.

The worm-gear drive 15 is fastened to a housing wall 16 of the bevel friction ring gearing 1 and drives a worm retained by friction 17 as worm-gear drive. The worm retained by friction 17 in turn is engaged with an eccentric coupling member 18 to which a spring-loaded coupling rod 19 is fastened. On the one hand the spring-loaded coupling rod 19 has a spring 19a and is connected With the eccentric coupling member 18 at an articulation point 20. On the other hand the spring-loaded coupling rod 19 is connected to the adjusting bridge guide 13 at its end 21 facing away from the eccentric coupling member 18.

If the worm-gear drive 15 now drives the worm 17 retained by friction, the eccentric coupling member 18 can be swiveled about an eccentric shaft 22 Which in turn moves the spring-loaded coupling rod 19. This movement of the spring-loaded coupling rod 19 is transmitted to the adjusting bridge guide 13, as a result of which migrating of the adjusting bridge 10 together with the friction ring 4 can be triggered or also stopped again.

Advantageously at least a double reduction in terms of the drive 14 is achieved by means of such a worm-gear drive 15 with a screw 17 retained by friction and an eccentric 18 as well as a spring-loaded coupling rod 19, so that the adjusting bridge guide 13 can be adjusted with minimal drive distances in an operationally safe manner.

The spring-loaded coupling rod 19 additionally has the advantage that with it an overload safety of the bevel friction ring gearing 1 can be realised in a constructionally simple manner, as a result of which the spring-loaded coupling rod 19 more preferably the adjusting bridge guide 13 during a critical operating state can always adjust the bevel friction ring gearing 1 by means of a predetermined spring force in such a manner that emergency running characteristics can always materialise automatically on the bevel friction ring gearing 1 with respect to the friction ring 4 and the two friction cones 2 and 3.

The screw 17 retained by friction specifically offers the advantage that the friction ring 4 can be held in its position in a particularly energy saving manner since the retention by friction of the screw 17 retained by friction can be advantageously selected in such a manner that adjustment of the eccentric 18 cannot be performed without the worm-gear drive 15 or only under certain circumstances.

Returning to the representation according to FIG. 1 it is furthermore clearly visible that the bevel friction ring gearing 1 can be substantially subdivided into a first gearing side 30 and a second gearing side 31. While the first gearing side 30 is substantially assigned bearing components and a cone space arranged between the first gearing side 30 and the second gearing side 31 is substantially assigned the two friction cones 2 and 3, the friction ring 4 with the adjusting device 9 as first most important components of the bevel friction ring gearing, a clutch 33 with a gyrating mass device 34 on the drive end 32 and a differential gearing 36 on the output end 35 can be assigned to the second gearing side 31.

The clutch 33 used here is already well known from the prior art so that in this regard merely a central release 33A a release piston 33B corresponding to said central release, a release cylinder 33C and a release spring 33D of suitably strong design for this purpose are numbered.

On the first gearing side 30 a first lubricant part space 37 is formed while on the second gearing side 31 a second lubricant part space 38 is formed. Both lubricant part spaces 37 and 38 belong to a first fluid space 39 of the bevel friction ring gearing 1 and are spatially connected with each other by means of a lubricant channel 40. Within the first fluid space 39 and thus also within the lubricant part spaces 37 and 38 is located a lubricant fluid which more preferably can lubricate the rolling bearing devices of the bevel friction ring gearing 1. In contrast with this, a traction fluid of the bevel friction ring gearing 1, which in terms of traction between the two friction cones 2 and 3 and the friction ring 4 can act in a supportive manner is located in a further fluid space 41, which is formed in the cone space and which for example can also comprise the gap 5 of the bevel friction ring gearing 1.

Advantageously additional external feed and/or discharge lines for the lubricant fluid can be omitted by means of the present lubricant channel 40, more preferably if the lubricant channel 40 penetrates at least the drive cone 2. Advantageously the lubricant channel 40 itself continues through a central tensile screw 42 by means of which more preferably a positive connection 43 between the drive cone 2 and an output device 44 of the bevel friction ring gearing is secured. Through the central tensile screw 42 constructed in such a manner the lubricant channel 40 extends to a region 45 in which a hydraulic lubricant fluid feed 46 can terminate.

In addition, the central tensile screw 42 is furnished with a clamping length which is at least twice the size of the screw diameter of the tensile screw 42, wherein the clamping length can be described as substantially greater than the screw diameter of the tensile screw 42. More preferably the tensile screw 42 has a tensile length which is greater than the setting length of the bevel friction ring gearing 1. Thus it can be guaranteed in an operationally safe manner that with regard to the positive connection 43 a spur toothing 47 of the drive cone 2 can always be adequately held in engagement with complementary toothing (not numbered here) of the drive device 44. In this connection it is to be understood that in an alternative embodiment a lubricant channel in the tensile screw can be omitted.

The output cone 3 furthermore comprises a pressing-on device 50 (see especially FIGS. 4 and 5), by means of which a pressing-on force dependent on the rotational moment can be generated. Here, the pressing-on device 50 comprises rolling bodies 51 which are arranged in corresponding rolling body races 52 and 53 of two bodies 54 and 55 displaceable relative to each other. Advantageously, the first rolling body race 52 is inserted directly within the output cone 3 so that drive cone 3 an displaceable body 54 are realised by one assembly and a particularly play-free pressing-on device 50 is realised on the bevel friction ring gearing 1. In addition to this, the pressing-on device 50 comprises a spring element 56 which can build up a pre-stress in the pressing-on device 50. There is also disclosed at least two needle bearings 81A and 81B disposed adjacent to the bearing pin 81.

Figure 2:
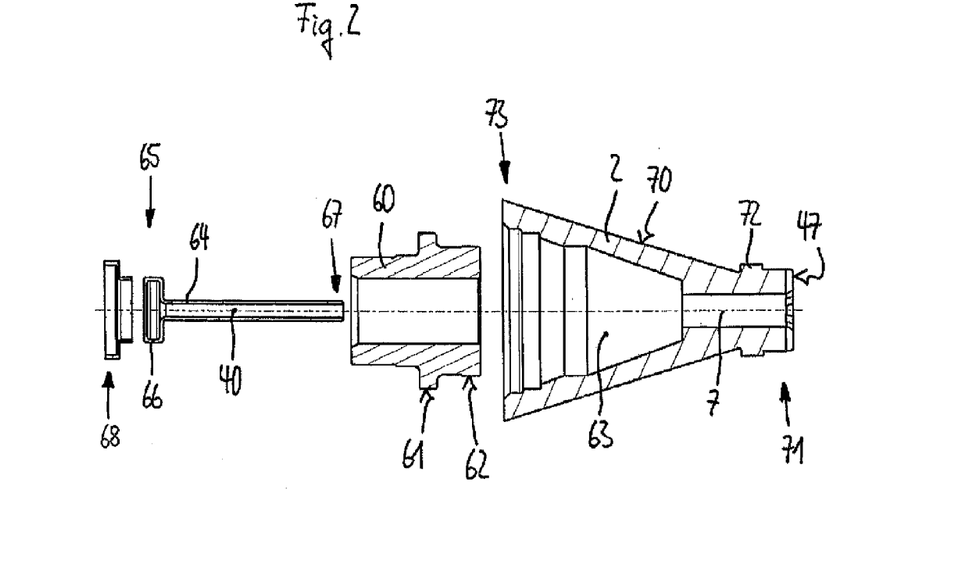
FIG. 2 an exploded drawing of the drive cone with a thrust shoulder for securing the friction ring against critical thrust in the event of a fault of the adjusting device of the bevel friction ring gearing according to FIG. 1.
Figure 3:
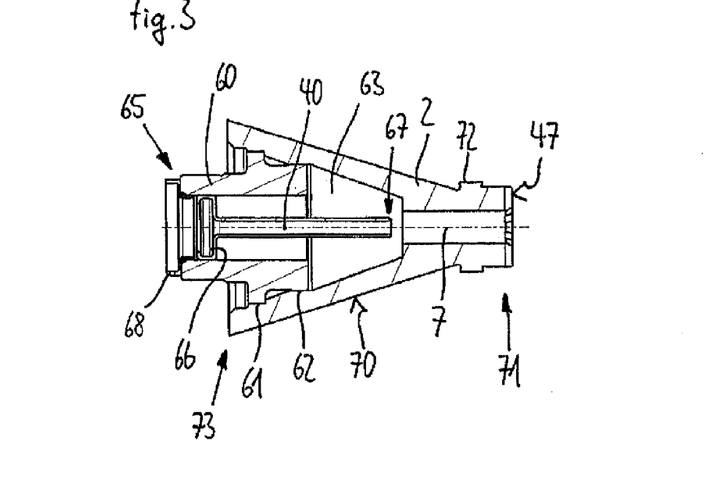
FIG. 3 the drive cone according to FIG. 2 in the assembled state.

The special construction of the drive cone 2 can be particularly taken from the representations according to FIGS. 2 and 3. The drive cone 2 comprises a separate bearing pin 60 having a first bearing seat 61 and a second bearing seat 62, so that the separate bearing pin 60 altogether can be fastened in the interior 63 of the drive cone 2 in a manner that is particularly secure against tilting. If applicable, the separate bearing pin 60 once it has been pressed into the drive cone 2 can be additionally welded, as a result of which the separate bearing pin 60 and the drive cone 2 are additionally sealed relative to each other in a fluid-tight manner.

Here, the first bearing seat 61 has a larger diameter than the second bearing seat 62, but both bearing seats 61 and 62 have a rotation-symmetrical seat surface. In that the two bearing seats 61 and 62 are axially arranged at different heights, good leverage conditions are obtained so that the drive cone 2 can be pressed on to the separate bearing pin 60 in a manner that is extraordinarily secure against tilting.

In the separate bearing pin 60 a rotating insert 64 for reducing the lubricant fluid quantity, more preferably the lubricant fluid quantity rotated in the cone, can be inserted. At a first end 65 of the rotating insert 64 a centrifugal separator 66 is additionally provided by means of which dirt particles from the lubricant fluid can be trapped. As a result, the rotating insert 64 is given a larger diameter at the first end 65 than at a further end 67, which is located opposite the first end 65. The first end 65 of the rotating insert 64 is additionally assigned an additional rotating device 68 for further increasing an opening diameter more preferably of the lubricant channel 40.

In addition, the drive cone 2 as forged component comprises a forged cone surface 70 which ends in a drive cone tip 71 in the region of a thrust shoulder 72. The thrust shoulder 72 is provided for securing the friction ring 4, so that the friction ring 4 cannot leave the cone surface 70 in the event of a fault of the bevel friction ring gearing 1. In the region of the cone foot 73 such a thrust shoulder 72 is missing on the drive cone 2, since on the drive cone 3 located opposite a corresponding additional thrust shoulder 80 (see particularly FIGS. 4 and 5) is arranged, which can take up the thrust of the friction ring 4 in a critical operating situation of the bevel friction ring gearing 1. Thus each drive cone 2 and 3 respectively only have exactly one thrust shoulder 72 and 80 respectively.

Figure 4:
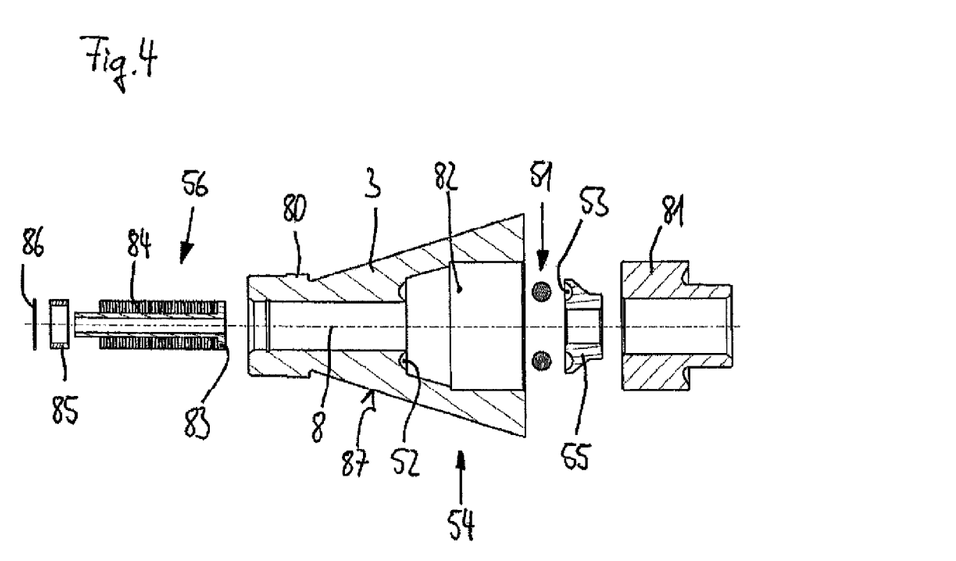
FIG. 4 an exploded view drawing of the output cone with a thrust shoulder for securing the friction ring against critical thrust in the event of a fault of an adjusting device of the bevel friction ring gearing according to FIG. 1.
Figure 5:
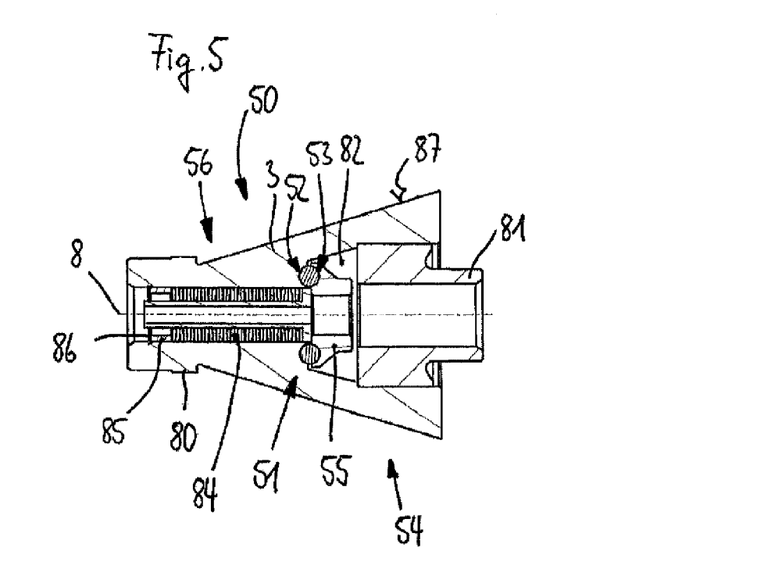
FIG. 5 the output cone according to FIG. 5 in the assembled state.

As is clearly visible from the detail representation of FIGS. 4 and 5 the drive cone 3 is pressed together with a further separate bearing pin 81, wherein the further separate bearing pin 81 is pressed into the interior 82 of the drive cone 3 (see FIG. 5).

In addition, the second pressing-on body 55, which comprises the second rolling body race 53 for the rolling bodies 51 is located in the interior 82 of the drive cone 3. A first rolling body race 52 corresponding with the second rolling body race 53 however is directly integrated in the drive cone 3, so that the drive cone 3 itself directly forms the first pressing-on body 54.

The spring device 56 is likewise inserted into the interior of the drive cone 3, wherein the spring device 56 substantially comprises a spring holder 83 and a multiplicity 84 of disc springs, which are slid on to the spring holder 83 as well as a spacer ring 85. The spring device 56 is secured within the output cone 3 by means of a locking washer 86.

The output cone 3 likewise as forged component comprises a further forged cone surface 87 so that the output cone 3 is also highly loadable.

Both friction cones 2 and 3 are mounted in a special manner on a housing 1A of the bevel friction ring gearing 1, so that more preferably assembly of the friction cones 2 and 3 can be advantageously carried out. On the one hand the drive cone 2 is mounted with a first drive cone bearing 88 and with a second drive cone bearing 89. On the other hand, the output cone 3 is mounted with a first output cone bearing 90 and a second output cone bearing 91.

The first drive cone bearing 88 and the first output cone bearing 90 are jointly located on the first gearing side 30. The second drive cone bearing 89 and the second output cone bearing 91 are jointly arranged on the second gearing side 31.

Advantageously the first drive cone bearing 88 and the first output cone bearing 90 are both held by a first common bearing carrier 92 of the cone friction ring gearing 1. Accordingly, the second drive cone bearing 89 and the second output cone bearing 91 are both held by a further common bearing carrier 93 of the bevel friction ring gearing 1. Because of this, substantially fewer tolerance problems are incurred so that both friction cones 2 and 3 can be accurately positioned relative to each other. This is true more so since both the first common bearing carrier 92 as well as the additional common bearing carrier 93 are each formed in one piece. Insofar, bearing eyes (not numbered here) for the corresponding bearing pairings 88 and 90 as well as 89 and 91 with the bearing carriers 92 and 93 respectively can be provided substantially more accurately on the bevel friction ring gearing 1. Here, the additional common bearing carrier 93 can be jointly formed with the housing wall 16 described above, as a result of which the bevel friction ring gearing 1 can be configured stiffer yet.

LIST OF REFERENCE NUMBERS

1 Bevel friction ring gearing
1A Housing
2 Drive Cone
3 Output cone
4 Friction ring
5 Gap
6 Double arrow
7 First axis of rotation
8 Additional axis of rotation
9 Adjusting device
10 Adjusting bridge
11 Guide arm
12 Guide wheel
13 Adjusting bridge guide
14 Drive
15 Worm-gear drive
16 Housing wall
17 Worm retained by friction
18 Eccentric
19 Spring-loaded coupling rod
20 Articulation point
21 End facing away
22 Eccentric shaft
31 Second gearing side
32 Drive end
33 Clutch
33A Central release
33B Release piston
33C Release cylinder
33D Release spring
34 Gyrating mass device
35 Output end
36 Differential gearing
37 First lubricant part space
38 Additional lubricant part space
39 First fluid space
41 Additional fluid space
42 Central tensile screw
43 Positive connection
44 Drive device
45 Region
46 Hydraulic lubricant fluid feed
47 Spur gearing
50 Pressing-on device
51 Rolling body
52 First rolling body race
53 Second rolling body race
54 First pressing-on body
55 Second pressing on body
56 Spring device
60 Separate bearing pin
61 First bearing seat
62 Second bearing seat
63 Interior of drive cone
64 Rotating insert
65 First end
66 Centrifugal force trap
67 Additional end
68 Additional rotating device
70 Forged cone surface
71 Drive cone tip
72 Thrust shoulder
73 Drive cone foot
80 Additional thrust shoulder
81 Additional separate bearing pin
82 Interior of the output cone
83 Spring holder
84 Multiplicity of disc springs
85 Spacer ring
86 Locking washer
87 Additional forged cone surface
88 First drive cone bearing
89 Second drive cone bearing
90 First output cone bearing
91 Second output cone bearing
92 First common bearing carrier
93 Additional common bearing carrier

The invention claimed is:

1. A bevel friction ring gearing, comprising:
an adjusting device comprising:
a guide;
an adjuster, comprising an adjusting bridge, for the friction ring being arranged in a free axially displaceable manner, on said guide wherein the adjuster comprises a worm-gear drive and a worm gear which engages with the guide to displace the friction ring; and
an eccentric coupling member and a coupling rod, wherein the worm-gear drive engages with said eccentric coupling member on which said coupling rod is arranged;
a shaft, wherein the worm gear drive engages with said worm gear, which engages with an outer region of said eccentric coupling member such that said eccentric coupling member is swiveled about the shaft driving said coupling rod via a connection between said coupling and said coupling rod which is an articulation point.

2. The bevel friction ring gearing according to claim 1, wherein the coupling rod engages with the guide comprising an adjusting bridge guide of the adjuster.

3. The bevel friction ring gearing according to claim 1, wherein the coupling rod is spring loaded.

4. The bevel friction ring gearing according to claim 1, wherein the worm-gear drive is of a design retained by friction.

5. The bevel friction ring gearing according to claim 1, with a drive cone that is operationally connected with a drive via a positive connection, wherein the positive connection is secured via a central screw.

6. The bevel friction ring gearing according to claim 1, further comprising:
a drive cone;
a drive;
a positive connection;
a tensile screw;
wherein said drive cone is operationally connected with said drive via said positive connection, wherein said positive connection is secured via said tensile screw.

7. The bevel friction ring gearing according to claim 6, wherein said tensile screw has a clamping length which is greater than a screw diameter.

8. The bevel friction ring gearing according to claim 7, wherein the clamping length of the tensile screw is at least twice the size of the screw diameter.

9. The bevel friction ring gearing according to claim 6, wherein the tensile screw has a clamping length which is at least twice the size of the screw diameter.

10. The bevel friction ring gearing according to claim 6, wherein the tensile screw has a tensile length which is greater than a setting length of the bevel friction ring gearing.

11. The bevel friction ring gearing according to claim 1 which comprises a drive cone and an output cone and separate fluid spaces for a traction fluid and for a lubricant fluid as well as two gearing sides, of which the one is arranged on the side of a cone tip of the drive cone and the other on the side of a cone foot of the drive cone, wherein the fluid space for the lubricant fluid comprises at least two part spaces and a first part space is arranged on the one gearing side and a second part space is arranged on the other gearing side, further comprising a lubricant channel which connects the two part spaces and penetrates one of the drive and output cones.

12. The bevel friction ring gearing according to claim 11, wherein the lubricant channel comprises two cone inlet openings to a rotating channel region with diameters deviating from each other.

13. The bevel friction ring gearing according to claim 11, wherein a wall of the lubricant channel in the interior of said one drive cone is radially further removed from the cone axis than the wall on the cone inlet openings.

14. The bevel friction ring gearing according to claim 13, wherein the lubricant channel widens within said one drive cone.

15. The friction ring gearing according to claim 11, wherein the lubricant channel penetrates a screw.

16. The bevel friction ring gearing according to claim 1, further comprising
at least two cones which interact with each other via the friction ring;
a pressing on device, wherein said at least two cones are clamped together via said pressing-on device for generating a pressing-on force dependent on the rotational moment, wherein said pressing-on device comprises rolling bodies which are arranged in corresponding rolling body races of two bodies displaceable relative to each other, wherein one of the rolling body races is formed in one of the cones.

17. The bevel friction ring gearing according to claim 1, further comprising
a seat; and
at least a first cone and a second cone which interact with each other via the friction ring, wherein at least the first cone comprises a separate bearing pin, wherein the separate bearing pin is connected with the first cone via said seat divided in two.

18. The bevel friction ring gearing according to claim 17, wherein both part seats have a rotation-symmetrical seat surface.

19. The bevel friction ring gearing according to claim 18, wherein both part seats are arranged at different axial heights.

20. The bevel friction ring gearing according to claim 19, wherein a first part seat is arranged axially outside with respect to the first cone and is radially larger than the second part seat arranged further axially inside.

21. The bevel friction ring gearing according to claim 17, wherein the first cone and the separate bearing pin are connected with each other via a press fit.

22. The bevel friction ring gearing according to claim 17, wherein the first cone and the separate bearing pin are welded together.

23. The bevel friction ring gearing according to claim 1, further comprising at least one forged cone.

24. The bevel friction ring gearing according to claim 23, wherein all cones have forged assemblies.

25. The bevel friction ring according to claim 1, further comprising:
at least two cones which interact with each other via the friction ring;
a needle bearing; and
a pressing on device configured to clamp said at least two cones together for generating a pressing on force dependent on the rotational moment, wherein the pressing on device comprises two bodies displaceable relative to each other, wherein at least one of the displaceable bodies is mounted on one of the cones via a needle bearing.

26. The bevel friction ring gearing according to claim 25, wherein the needle bearing is of a split design.

27. The bevel friction ring gearing with a clutch arranged on the input side and/or a clutch on the output side, according to claim 1, wherein the clutch is hydraulically activated.

28. The bevel friction ring gearing according to claim 1, further comprising
a pressing on device;
at least two cones which interact with each other via the friction ring and are clamped together via said pressing-on device for generating a pressing-on force dependent on the rotational moment, wherein the pressing-on device comprises two bodies displaceable relative to each other;
a spring element, wherein the spring element can be removed without removing the displaceable bodies.

29. The bevel friction ring gearing according to claim 1, further comprising:
a pressing on device;
bearings;
at least two bearing carriers;
at least two cones which interact with each other via the friction ring, which are clamped together via said pressing-on device for generating a pressing-on force dependent on the rotational moment and which are mounted in both sides in said bearings which are held in said bearing carriers, wherein both bearing carriers are designed in one piece.

30. The bevel friction ring bearing according to claim 1 wherein said at least one cone is configured to provide at least two needle bearing races for a split needle bearing.

* * * * *